United States Patent [19]

Morimoto et al.

[11] Patent Number: 5,040,880

[45] Date of Patent: Aug. 20, 1991

[54] QUARTZ OPTICAL FILTER

[75] Inventors: Yoshifumi Morimoto, Kashihara City; Junji Tanaka, Sakurai City; Eiji Tanaka, Itami City, all of Japan

[73] Assignee: Matsushita Electric Industrial Co., Ltd., Kadoma, Japan

[21] Appl. No.: 409,590

[22] Filed: Sep. 15, 1989

[51] Int. Cl.$^5$ .............................................. G02B 5/28
[52] U.S. Cl. ................................. 359/498; 359/502
[58] Field of Search ............... 350/401, 400, 403, 404, 350/314, 406, 408, 316, 317, 319; 358/44, 50, 55

[56] References Cited

U.S. PATENT DOCUMENTS

| | | | |
|---|---|---|---|
| 4,407,566 | 10/1983 | Rosenberg et al. | 350/404 |
| 4,500,178 | 2/1985 | Yeh | 350/400 |
| 4,761,682 | 8/1988 | Asaida | 350/404 |

Primary Examiner—Rodney B. Bovernick
Assistant Examiner—James Phan
Attorney, Agent, or Firm—Cushman, Darby & Cushman

[57] ABSTRACT

By forming corner parts of transparent quartz plates and the glass plate in rounded arc shape, in a mirror-surface finishing to accurate plane, polishing powder grain can flow out smoothly and evenly from all the periphery of the plates, and thus the surfaces of those component plates are finished to accurate plate of mirror-surfaces, without making a recessed part at their central parts which has been observed in the conventional plates of rectangular form, and hence, a quartz optical filter made by laminating the improved plates having accurate planes attains an excellent performance characteristic which does not give any degradation in light propagation.

8 Claims, 4 Drawing Sheets

QUARTZ OPTICAL FILTER

FIELD OF THE INVENTION AND RELATED ART STATEMENT

1. Field of the Invention

The present invention relates to a quartz optical filter which is to be disposed in front of a solid-state picture-taking device or a picture-taking tube in a picture image input apparatus e.g. a color video camera or an electronic still camera.

2. Description of the Related Art

Hitherto, in a picture image input apparatus such as a color video camera or an electronic still camera or the like, a quartz optical filter 3 has been disposed between a lens 1 and a solid-state picture-taking device (or picture-taking tube) 2, as shown in FIG. 6.

A single-plate type solid-state picture-taking device 2 has a great number of picture elements, and a plurality of picture elements in a small area forms one block, whereby processing of signals from each block determines what the color at the picture element was. A quartz optical filter 3 of stripe type is provided in order to distribute the light to each of the above-mentioned blocks by its effect of birefringence. Thus, each of those distributed lights is supplied through a stripe to each picture element of respective blocks. In this case, each stripe filter 4 has its own individual selectivity on different colors of R, G, and B. For example, a first one selects only the R-component out of one light component separated by the quartz optical filter 3, thereby passing and supplying it to one picture element which corresponds to the R-component. Other stripe filters pass and supply the G- and B-components out of other light components separated by the quartz optical filter 3 to picture elements of corresponding colors. By such a process, it becomes possible to correctly determine what color light was impinging the relevant block, by carrying out processings in the following processing stages.

The optical filter of prior art used in the above-mentioned manner has a configuration as shown in FIG. 7, for example.

In FIG. 7, numerals 5, 6, and 7 designate transparent quartz plates, and numeral 8 designates a color-correction filter plate. These components are laminated and fixed to each other by transparent optical cements 9.

However, there has been a problem that their central parts on their front and rear faces were always slightly recessed and the light did not propagate correctly. The inventors found through plenty of experimental study that such center-recessed distortions of the transparent quartz plates 5 through 7 and the glass filter plate 8 are induced because the above-mentioned transparent quartz plates 5 through 7 and filter plate 8 had rectangular shape.

That is, in the conventional way of making respective transparent quartz plates 5 through 7, the mirror-surfaced accurate plane must be polished up starting from the square plates, and this polishing has been carried out as illustrated in FIG. 8.

Numerals 10 and 11 designate an upper and a lower grinding plates, respectively. The quartz transparent plates 5 through 7 fed with polishing powder grain at their central parts of their front and rear faces are inserted between those upper and lower grinding plates 10 and 11. Then the upper and lower grinding plates 10 and 11 are rotated or revolved reverse directions to one another.

Thereby, the front and rear faces of the transparent quarts plates 5 to 7 are polished up to the mirror-surface accurate planes.

However, in the polishing process of the above-mentioned prior art transparent quartz plates 5 to 7 and filter glass plate 8, these plates are ground or pushed always to result in a plane having a shallow and gentle recess at the center part. The reason for forming such a recess is conjectured as follows. In the process of the polishing, the polishing powder grain gradually spreads radially outward, thereby to make a circular form which expands as revolutions of the above-mentioned grinding plates 10 and 11 go on. Since all the plates have rectangular shapes, flows of polishing powder grain in the diagonal direction of those quartz plates 5 through 7 and the filter glass plate 8 were not smooth enough to drain out. This is conjectured because the distances from the central part of the plates to corner parts (indicated by A in FIG. 7), namely in the diagonal direction, were longer than those in other directions. This may be the reason that in the experimental result showed that the central parts of the rectangular quartz plates 5 to 7 and the filter glass plate 8 were excessively polished, thus inducing the states that their central parts were slightly recessed on either of their front or rear side or both. Hence, correct propagation of light has been hindered.

OBJECT AND SUMMARY OF THE INVENTION

The purpose of the present invention is to present a quartz optical filter whose front and rear faces have accurate planar surface so as to enable the light therethrough to propagate correctly.

In order to achieve this purpose, in the present invention, the corner parts of a transparent quartz plate are made in arc shapes or rounded.

In accordance with this procedure, the corner tip parts of the quartz plate are omitted to make the end part round. That is, those parts are cut out and rounded to be a circular arc shape. Hence the distance from the center part to the farthest points of the corner parts are shortened. Thereby, the drainage of the polishing powder grain is smooth and evenly distributed from the corner parts. And experimental result proved that both the front and rear faces of the quartz plate are polished up to accurate plane of mirror-surface finish. Consequently, it becomes possible to offer a quartz optical filter which allows correct propagation of the light propagating therethrough.

It will be recognized that some or all of the Figures are schematic representations for purposes of illustration and do not necessarily depict the actual relative sizes or locations of the elements shown, and all the members are drawn thicker than they are actually.

DETAILED DESCRIPTION OF THE PREFERRED EMBODIMENTS

Figure 1:
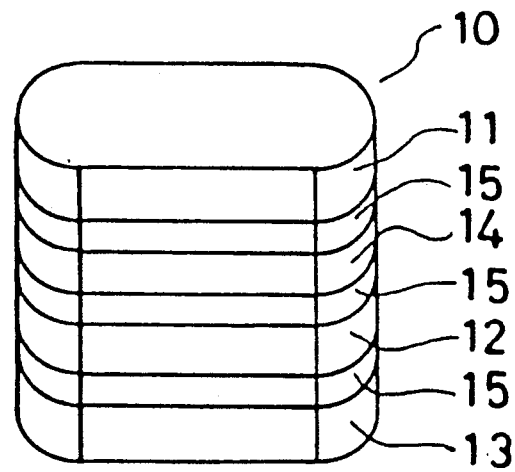
FIG. 1 is a perspective view of a quartz optical filter in accordance with a first embodiment of the present invention.

FIG. 1 shows a first embodiment of the present invention, wherein, a quartz optical filter assembly 10 is made by stacking three pieces of transparent quartz plates 11, 12 and 13, a piece of glass plate 14 for color-correction and layers of transparent optical cement 15, 15, 15 inserted between those component plates.

The transparent quartz plates 11 through 13 are formed first in a rectangular flat plane shape and have a size of about 0.5-2.5 mm thickness, 9-15 mm width, and 8-13 mm length. The quartz plates are shaped (cut at their corner parts) to have circular arcs of a radius of about 5 to 7 mm at their respective four corner parts.

The glass plate 14 has approximately the same size and shape as that of transparent quartz plates 11 through 13. Its four corners are similarly cut out to circular arcs. Its thickness is about 0.8 to 1.6 mm. In this embodiment, it is colored blue.

The optical cement 15 is a colorless and transparent substance of polybutadiene group and is a UV-light hardening type.

Thus, after stacking the transparent quartz plates 11 to 13 with the glass plates 14 inserted therebetween and the cement 15 inserted therebetween, as shown in FIG. 1, a UV-light is illuminated from one side or from both sides of the transparent quartz plates 11 and 13. Then, the cement inserted between interfaces of those laminated plates is cured. Thus, the above-mentioned components are assembled into a single quartz optical filter 10.

The quartz optical filter 10 thus formed exhibits the following two features.

(1) By adopting the shape of rounded corners for the transparent quartz plates 11 through 13 and the glass plate 14, end tips at the four corners, namely farthest points from the center parts, of the quartz plates 11 through 13 and of the glass plate 14 are omitted. That is, four corner parts are all cut out, thereby making circular arcs there. Experimental study shows that, at the time of mirror-place finishing of such plates, polishing powder grains can flow out evenly and smoothly, substantially equally from the four corner parts and from nearer-to-central part. Accordingly the front and the rear faces of all of these transparent quartz plates 11 to 13 and of the glass plate 14 are finished to flat planes with mirror-surfaces; and hitherto-observed recessed surfaces having a recess at their central parts are eliminated.

Thus, the light correctly propagates through these transparent quartz plates 11 to 13 as well as through the glass plate 14, and thereby, a correct characteristic designed for a quartz optical filter was obtained.

(2) Since rectangular transparent quartz plates 11 to 13 and glass plate 14 are cut out to form circular arcs at their four corner parts, the distances to the farthest points from their central parts are shortened considerably. As a result, as shown in FIG. 1, the cement 15 spreads out smoothly to peripheral edges of the transparent quartz plates 11 to 13 and of the glass plate 14. Hence the cement flows out to outside of the peripheral edge, without remaining in the hitherto observed recesses on the plate surface, but forming uniform-thickness layer of the optical cement. Such uniform-thickness layer of cement not only makes the binding force stronger, but also is good for ideal and correct light propagation.

That is, drops of cement 15, which are dropped on the central part of the transparent quartz plates 12 and 13 and on the glass plate 14 in the process of making this quartz optical filter are smoothly spread and flow out from the peripheral edges of the transparent quartz plates 12 and 13 and of the glass plate 14 evenly at the rounded corner parts and at near-center parts, as shown in FIG. 1. Such smooth and even flowing out of the cement is observed when the farthest parts or the corners are formed round or in a circular arc shape.

Then thereafter, by illuminating the UV-light to cure the cement as has been described above, these plates are tightly fixed to each other.

According to the present invention, the component plates in the quartz optical filter assembly 10 does not have recessed surfaces, and therefore, there is no undesirable vacant space, which is produced by failure of spreading of cement in the filter assembly 10 and causes a low light transmission through the assembly 10. Therefore, there is no fear that the light propagation is hindered in the vacant space.

Next, a 2nd embodiment of the present invention is described with reference to FIG. 2. Parts and components corresponding to those in the first embodiment are shown by the same numerals and marks, and the description thereon made in the first embodiment similarly apply. Differences and features of this 2nd embodiment from the first embodiment (FIG. 1) are as follows.

A quartz optical filter 10A of this second embodiment comprises transparent quartz plates 11A to 13A and a glass plate 14A similar to the first embodiment of FIG. 1. The plates are shaped up starting from a nearly square shape plates to a near circular disk by considerably cutting their four corner parts. Thus, owing to starting from this nearly circular disk shape, this quartz optical filter 10A becomes excellent in symmetry of shape, and hence it can keep a fairly good weight balance property around its center.

Consequently, even in the case that this near circular quartz optical filter 10A is installed into a piezoelectric autofocusing mechanism of a video camera or an electronic still camera, for example, because of its good weight balance around the center, a possible degradation of its autofocusing performance due to a poor weight balance is prevented.

Figure 2:
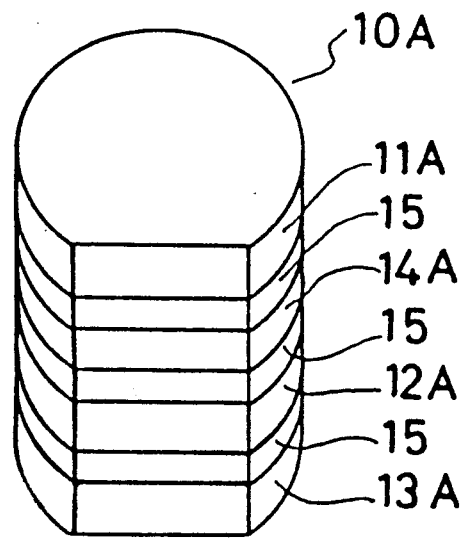
FIG. 2 is a perspective view of a quartz optical filter in accordance with a second embodiment of the present invention.

Hereupon, in FIG. 2, the reason that a small flat part is left at a part on each of peripheries of the transparent quartz plates 11A to 13A is to indicate orientations of optic axes of respective transparent quartz plates 11A to 13A. The orientations are so selected that by stacking respective transparent quartz plates 11A to 13A with keeping those individual flat parts aligned on a same plane, such orientations are aligned automatically so that the optic axes cross each other keeping a prescribed angles.

Figure 3:
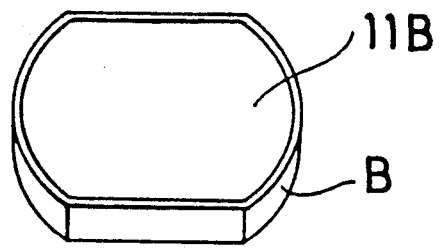
FIG. 3 and FIG. 4 are perspective views of a transparent quartz plate of a quartz optical filter and a perspective view showing an assembled quartz optical filter of a third embodiment of the present invention, respectively.
Figure 4:
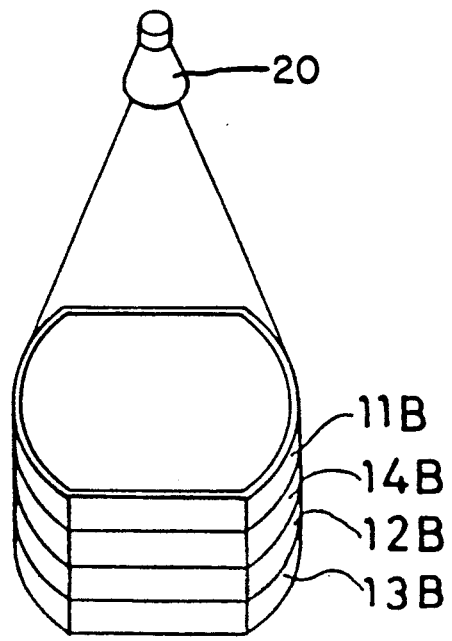

FIG. 3 and FIG. 4 show a 3rd embodiment of the present invention. Parts and components corresponding to those in the first embodiment are shown by the same numerals and marks, and the description thereof made in the first embodiment similarly apply. Differences and features of this 3rd embodiment from the first embodiment are as follows. In this embodiment, two flat parts are formed on both side-end parts of transparent quartz plates 11B–13B and a glass plate 14B so that they are formed to an oval-shape.

Also, respective component plates 11B–13B and 14B are covered with a black coating film B of an epoxy-group substance over their whole surface before carrying out a mirror-surface finishing process on their front and rear faces. Then, their front and rear faces are polished up to the mirror-surfaces using a polishing powder grain. These black coatings B are provided for the following reasons. In the above-mentioned mirror-surface finishing process of those transparent quartz plates 11B to 13B and the glass plate 14B, small "breakings" are liable to occur accidentally on their peripheral edge parts. The resin film of the black coating B on the peripheral edge parts of those plates acts as a reinforcing member against the above-mentioned "breakings" which may occur at the peripheral edge parts during the mirror-surface polishing process, and prevents those "breakings". These black coating B coated over the front and rear face parts is removed automatically in the above-mentioned mirror-surface finishing process by the action of its included polishing powder grain.

Another reason for providing the black coating B is to prevent the possible leakage of the UV-light used in the afore-mentioned cement-hardening process to the peripheral outside parts. In the cement-hardening process illustrated in FIG. 4, a UV-light from a UV-light source 20 is projected onto the front face of the transparent quartz plates 11B to harden the cement. In this process the UV-light is absorbed by the black coating B and never leaks out to the outside of the periphery of the assembled quartz optical filter. Therefore, a small amount of excessive cement pushed out on the periphery of the quartz optical filter is not hardened. Then, After assembling and fixing those transparent quartz plates 11B to 13B and the glass plates 14B by using the cement, the excessive cement which has been pushed out on the peripheral side wall is not hardened, and can be removed easily. This assures the smooth side wall surface finishing of the assembled quartz optical filter.

Figure 5:
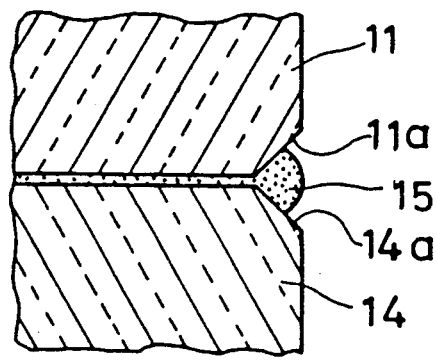
FIG. 5 is a cross-sectional view of the principal part of a quartz optical filter in accordance with a fourth embodiment of the present invention.
Figure 6:
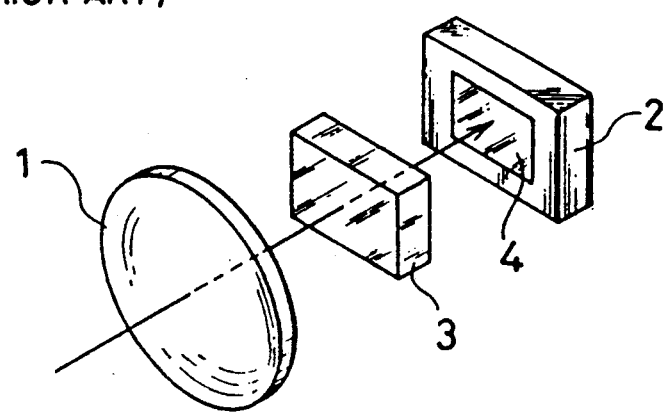
FIG. 6 is a perspective view of the principal part of a general optical apparatus whereto a quartz optical filter of prior art and the present invention is applied.
Figure 7:
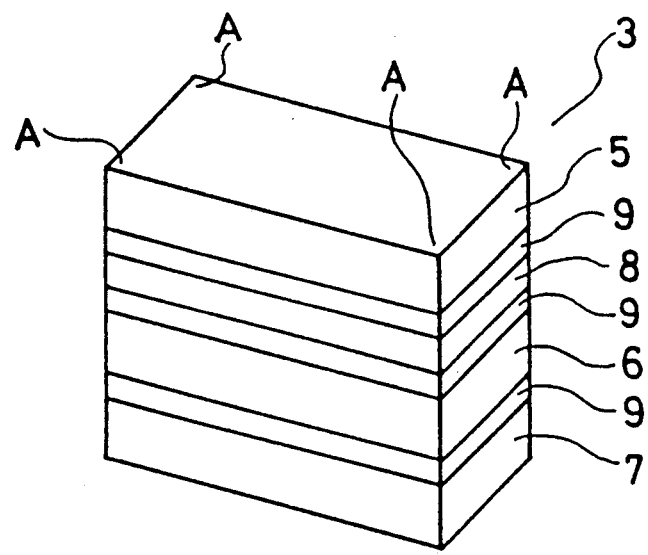
FIG. 7 is a perspective view of a quartz optical filter of prior art.
Figure 8:
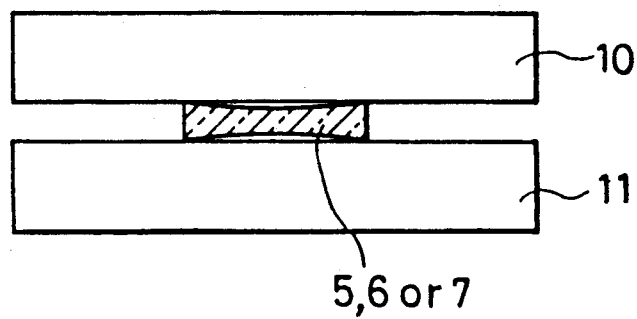
FIG. 8 is a cross-sectional view showing a polishing process of a conventional transparent quartz plate.

FIG. 5 illustrates a 4th embodiment of the present invention. Parts and components corresponding to those in the first embodiment are shown by the same numerals and marks, and the description thereof made in the first embodiment similarly apply. Differences and features of this 4th embodiment from the first embodiment are as follows. In this embodiment, small oblique facets 11a and 14a are provided on the peripheral edges of the cemented sides of the transparent quartz plate 11 and of the glass plate 14, respectively. By this configuration, a small space of an outward-extending section is formed between these oblique facets 11a and 14a, and in this space the excessive cement 15 can stay. Consequently, any projection which is due to the excessive amount of cement that projects from the face of side wall of the assembled quartz optical filter is eliminated. Moreover, this excessive cement staying in this small space between those oblique facets 11a and 14a acts as an air-tight packing member for preventing the invasion of humidity into the interface between the transparent quartz plate 11 and the glass plate 14.

Although the invention has been described in its preferred form with a certain degree of particularity, it is understood that the present disclosure of the preferred form may be changed in the details of construction, and the combination and arrangement of parts may be altered without departing from the spirit and the scope of the invention as hereinafter claimed.

What is claimed is:

1. A quartz optical filter comprising:
    a plurality of transparent quartz plates having corner parts with a rounded shape, and
    a transparent optical cement layer for fixing said plurality of transparent quartz plates,
    said plurality of quartz plates being laminated in a manner that their optic axes cross each other with prescribed angles, and
    wherein an oblique facet having a cross section extending outward is formed around and on peripheral edge parts of the cement layer of the transparent quartz plates.

2. A quartz optical filter in accordance with claim 1, wherein the rounded shape is a circular arc shape.

3. A quartz optical filter in accordance with claim 1, further comprising a coating film which is formed on the peripheral outside walls of said transparent quartz plates.

4. A quartz optical filter in accordance with claim 1, wherein said cement layer is of a UV-light hardening type cement and a black coating film is formed on the peripheral outside walls of said transparent quartz plates.

5. A quartz optical filter comprising:
    a glass plate,
    a pluraliy of transparent quartz plates which are laminated together with said glass plate for color-correction, and
    at least a transparent optical cement layer for fixing said plurality of transparent quartz plates and said glass plate integrally,
    said quartz plates having optic axes kept crossed to each other,
    said plurality of transparent quartz plates and said glass plate having corner parts with a rounded shape, and
    wherein an oblique facet having a cross section extending outward is formed around and on peripheral edge parts of the cement layer of the transparent glass plates.

6. A quartz optical filter in accordance with claim 5, wherein said rounded shape is a circular arc.

7. A quartz optical filter in accordance with claim 5, further comprising a coating film which is formed on the peripheral outside walls of said transparent quartz plates.

8. A quartz optical filter in accordance with claim 7, wherein said cement layer is of a UV-light hardening type cement and a black coating film is formed on the peripheral outside walls of said transparent quartz plates.

* * * * *